United States Patent [19]

Nezu et al.

[11] Patent Number: 5,817,718
[45] Date of Patent: Oct. 6, 1998

[54] SOLID-POLYMER-ELECTROLYTE MEMBRANE FOR FUEL CELL AND PROCESS FOR PRODUCING THE SAME

[75] Inventors: Shinji Nezu, Obu; Masaki Gondo, Hashima, both of Japan

[73] Assignee: Aisin Seiki Kabushiki Kaisha, Kariya, Japan

[21] Appl. No.: 688,769

[22] Filed: Jul. 31, 1996

[30] Foreign Application Priority Data

Jul. 31, 1995 [JP] Japan .................................... 7-195590
Jul. 29, 1996 [JP] Japan .................................... 8-199380

[51] Int. Cl.$^6$ .................................................. C08G 63/48
[52] U.S. Cl. ............................ 525/64; 522/125; 429/130
[58] Field of Search ............................. 525/64; 522/125; 429/130

[56] References Cited

U.S. PATENT DOCUMENTS

| | | | |
|---|---|---|---|
| 4,012,303 | 3/1977 | D'Agostino et al. | 204/159.17 |
| 4,605,685 | 8/1986 | Momose et al. | 522/724 |
| 4,952,630 | 8/1990 | Morgan et al. | 525/72 |

OTHER PUBLICATIONS

"gamma Irradiation–Induced Grafting of Poly(styrenesulfonate) to Poly(tetrafluoroethylene) Shielded Microelectrodes", Ramos et al., 1931–1935, Jun. 1, 1994.

"Infrared Investigation of Ionic Hydration in Ion–exchange Membranes", Levy et al., 17–28, Dec. 31, 1982.

Electrochimica Acta, vol. 40, No. 3, pp. 345–353, 1995, F.N. Buechi, et al., "Study of Radiation–Grafted FEP–g–Polystyrene Membranes as Polymer Electrolytes in Fuel Cells".

*Primary Examiner*—M. Nuzzolillo
*Assistant Examiner*—Steven H. Ver Steeg
*Attorney, Agent, or Firm*—Oblon, Spivak, McClelland, Maier & Neustadt, P.C.

[57] ABSTRACT

A solid-polymer-electrolyte membrane for a polymer-electrolyte fuel cell is formed of a synthetic resin. The synthetic resin includes a main chain, and a hydrocarbon-based side chain. The main chain is formed as a film, and formed of a copolymer made from a fluorocarbon-based vinyl monomer and a hydrocarbon-based vinyl monomer. The hydrocarbon-based side chain involves a sulfonic group. The solid-polymer-electrolyte membrane exhibits a high strength and flexibility, but a low electric resistance, and can be produced at a reduced manufacturing cost. Thus, the solid-polymer-electrolyte membrane can be effectively applied to construct polymer-electrolyte fuel cells.

15 Claims, 3 Drawing Sheets

SOLID-POLYMER-ELECTROLYTE MEMBRANE FOR FUEL CELL AND PROCESS FOR PRODUCING THE SAME

BACKGROUND OF THE INVENTION

1. Field of the Invention

The present invention relates to a solid-polymer-electrolyte membrane for a polymer-electrolyte fuel cell, and a process for producing the same.

2. Description of Related Art

A polymer-electrolyte fuel cell employs hydrogen and oxygen as a fuel and an oxidizing agent, respectively, and is considered a promising small-and-lightweight power source to be applied to automobiles, etc. Such a fuel cell comprises a solid-polymer-electrolyte membrane having opposite surfaces, a positive electrode disposed in contact with one of the opposite surfaces of the membrane, and a negative electrode disposed in contact with another one of the opposite surfaces of the membrane. Hydrogen is oxidized electrochemically at the negative electrode to produce protons and electrons. The protons are transferred through the solid-polymer-electrolyte membrane to the positive electrode, to which oxygen is supplied. Whilst, the electrons produced at the negative electrode flow by way of a load, which is connected to the fuel cell, to the positive electrode. At the positive electrode, the electrons react with protons and oxygen to produce water.

It has been known that the performance of a fuel cell depends greatly on the performance of the gas diffusion electrodes used as the positive and negative electrodes, and on the performance of solid-polymer-electrolyte membrane. The performance required for solid-polymer-electrolyte membrane is to permit as many protons as possible to flow. In order to establish the required performance, it has been known that it is important to introduce as many sulfonic groups as possible which are capable of imparting an ion-exchange capability to solid-polymer-electrolyte membrane.

A fluorocarbon-based resin, for example, Nafion (Trade Mark) and its derivatives, has been known as a few of the representatives of the solid-polymer-electrolyte membranes for the fuel-cell application. Nafion is based on a copolymer made from tetrafluoroethylene and perfluorovinylether, and is provided with sulfonic groups working as ion-exchanging groups.

However, solid-polymer-electrolyte membranes formed of Nafion, and the like, liquify when the sulfonic groups, working as ion-exchanging groups, are introduced into the membranes in an increasing quantity in order to decrease the electric resistance of the membranes. Thus, the sulfonic groups should be introduced into the membranes in a limited quantity. Moreover, as the quantity of the introduced sulfonic groups increases, the strength of the resulting membranes degrades. When the membranes have a low electric resistance, they suffer from a problem in that they break during operation of the fuel cells. Due to these reasons, membranes formed of Nafion, and the like, exhibit an ion-exchanging capacity of 1.1 milli-equivalent/g at the highest. Thus, it has been desired that the membranes be further improved in terms of ion conductivity.

Ion-exchange membranes formed of Nafion, and the like, have been put into practical applications in the field of brine electrolysis industry, and have been known to have a good chemical stability. However, Nafion, and the like, are very expensive, because they are fluorocarbon-based resins. Considering the application of polymer-electrolyte fuel cell to automobiles, it is required that the current cost of solid-polymer-electrolyte membrane formed of Nafion be decreased by about one-to-a couple of dozens to one-to-a couple of hundreds. If not, the fuel cell can hardly be believed to be put into practical applications.

There are other approaches for preparing solid-polymer-electrolyte membranes: namely; side chains, into which sulfonic groups can be introduced, are brought into base films by radiation-graft polymerization. For instance, styrene, or the like, is graft-polymerized into a Teflon (Trade Mark)membrane or a Teflon-based copolymer film, and thereafter sulfonic groups are introduced into the resulting graft-polymerized polystyrene chain. The solid-polymer-electrolyte membranes prepared by this process cannot contribute to attaining sufficient fuel cell performance because of the problems hereinafter described.

As described in Electrochimica, Acta 40,345 (1995), a fuel cell was prepared by using a solid-polymer-electrolyte membrane. The membrane was prepared by graft-polymerizing styrene onto tetrafluoroethylene-hexafluoroproplylene (i.e., FEP) copolymer film exposed to gamma radiation. Sulfonic groups were then introduced into the thus graft-polymerized copolymer film to prepare the membrane, and the resulting membrane was incorporated into a fuel cell. The literature reports that, immediately after operating the fuel cell, the membrane decomposed, and thereby the sulfonic groups were eliminated. As a result, the internal resistance of the fuel cell increased, and its performance thereof deteriorated sharply even after operating the fuel cell for a couple of dozens of hours. The literature also refers to the fact that the fuel cell lacks sufficient output performance because the membrane was inferior to Nafion in terms of ion conductivity. The literature further reveals that the inadequate chemical stability of the graft-polymerized polystyrene side chains resulted in the decomposition of the membrane under the operating conditions of the fuel cell.

In addition, other processes have been known for preparing polymer ion-exchange exchange membranes, and are premised on the recognition that sulfonated polystyrene side chains have insufficient chemical stability. According to these processes, $\alpha$, $\beta$, $\beta$-trifluorostyrene, one of fluorinated styrenes, is graft-polymerized into a tetrafluoroethylene polymer membrane or a tetrafluoroethylene-based copolymer membrane, and the graft-polymerized membrane is sulfonated to prepare a polymer ion-exchange membrane. For example, see U.S. Pat. No. 4,012,303 and U.S. Pat. No. 4,605,685. These U.S. patents do not specifically describe the operating characteristics of the resulting polymer ion-exchange membranes which are applied to a polymer-electrolyte fuel cell. The inventors of the present invention, however, estimate that the membranes suffer from the following problems.

Firstly, fluorinated styrene or $\alpha$, $\beta$, $\beta$-trifluorostyrene pushes up the manufacturing cost, because it is difficult to synthesize fluorinated styrene or $\alpha$, $\beta$, $\beta$-trifluorostyrene. Thus, similar to the problem associated with Nafion, and the like, the cost problem hinders the polymer ion-exchange membranes from the application to solid-polymer-electrolyte fuel cell.

Secondly, in the radiation-graft polymerization of $\alpha$, $\beta$, $\beta$-trifluorostyrene, the reactivity is so low that $\alpha$, $\beta$, $\beta$-trifluorostyrene can be introduced limitedly into the tetrafluoroethylene polymer membrane or tetrafluoroethylene-based copolymer membrane in an amount of 50% by weight or less. As a result, the sulfonic groups cannot be introduced into the graft-polymerized membrane in a large amount. Hence, in the application to solid-polymer-electrolyte fuel cell, the membranes lack sufficient ion conductivity, similar to the membranes formed of Nafion, and the like. Thus, the membranes cannot solve the problems associated with the membranes formed of Nafion, and the like.

Thirdly, the membranes exhibit such a degree of flexibility that they are likely to break during preparation or in the operation of a fuel cell.

SUMMARY OF THE INVENTION

The present invention has been developed in view of the aforementioned circumstances. It is therefore an object of the present invention to provide a solid-polymer-electrolyte membrane which can be produced at a reduced cost, has a high ion conductivity, a high durability, and a satisfactory strength.

Extensive research has now been conducted on radiation-graft polymerization processes for preparing a solid-polymer-electrolyte membrane which has suitable performance for use in polymer-electrolyte fuel cells. We have discovered the following facts:

When non-hydrogen containing, completely fluorinated polymer membranes such as tetrafluoroethylene-hexafluoropropylene (i.e., FEP) copolymer are irradiated with gamma-rays or the like, thereby producing radicals, and then a polymerizable vinyl compound such as styrene, is graft-polymerized onto the membrane, and thereafter sulfonic acid groups are introduced into the graft-polymerized membrane by a sulfonating reaction to prepare a solid polymer-electrolyte membrane, the thus prepared membranes are very brittle.

First of all, when the completely fluorinated polymer membrane was irradiated by a gamma ray, or the like, the irradiated membrane showed a considerable strength deterioration. When the irradiated membrane was further subjected to the graft-polymerization reaction and the sulfonating reaction, the strength of the resulting membrane further degraded. Hence, when a membrane having an ion conductivity was prepared by using a completely fluorinated polymer membrane, the resulting membrane was so brittle that it broke in the preparation or operation of fuel cell. In fact, it was impossible to prepare a fuel cell.

In order to solve the problem of loss of strength, attempts were made to irradiate polymer membranes at reduced doses. It was, therefore, possible to prepare a fuel cell using the resulting membrane, and to operate the fuel cell. However, immediately after operating the fuel cell, the fuel cell exhibited an appreciable internal resistance increment. Thus, the resulting membrane had apparently decomposed.

2) When a polytetrafluoroethylene (i.e., PTFE) polymer membrane or a tetrafluoroethylene-perfluoroalkylvinylether (i.e., PFA) copolymer membrane was employed as a base film for the radiation-graft polymerization, phenomena similar to the above 1) could be observed more apparently. In fact, it was impossible to prepare a fuel cell by using the PTFE polymer or PFA copolymer membrane.

3) A polymer membrane involving hydrocarbon, such as an ethylene-tetrafluoroethylene (i.e., ETFE) copolymer membrane, was subjected to the same radiation-graft polymerization in order to graft-polymerize styrene, and the graft-polymerized membrane was sulfonated to prepare a solid-polymer-electrolyte membrane. Contrary to the above 1) and 2), the resulting membrane maintained the strength which was sufficient to prepare and operate a fuel cell. Moreover, after operating fuel cells employing the membrane for hundreds of hours, the membrane did not deteriorate appreciably.

The aforementioned discovery recited in the above 3) was one of the bases for completing the present invention. It is important as well, because the decomposition of styrene-graft-polymerized membranes prepared by the radiation-graft polymerization was not caused by the mechanism which has been contemplated in the related arts. Specifically, the discovery means that the decomposition of styrene-graft-polymerized membranes does not result from the decomposition of graft-polymerized styrene side chains, but depends on the properties of base films.

As a result, it is unnecessary to use fluorinated styrene or $\alpha$, $\beta$, $\beta$-trifluorostyrene to compensate for the chemical stability of graft-polymerized styrene side chains. Accordingly, it is possible to solve the problems (e.g., high cost, improper ion conductivity, etc.) associated with $\alpha$, $\beta$, $\beta$-trifluorostyrene.

In addition, the discovery also indicates that a polymer membrane involving a hydrocarbon, such as an ethylene-tetrafluoroethylene (i.e., ETFE) copolymer membrane, does not deteriorate considerably upon exposure to radiation.

We, the inventors of the present invention, continued the research and development on the differences between the completely fluorinated polymer membrane and the polymer membrane involving unfluorinated hydrocarbon segments which were subjected to the radiation-graft polymerization. We further discovered the facts described below.

4) In the completely fluorinated polymer film, the cleavages occurred dominantly in the main chains by the energy of the irradiated ray, and the graft-polymerized styrene side chains were bonded to low-molecular-weight fragments resulting from the cleaved main chains. The low-molecular-weight fragments with the graft-polymerized styrene side chains bonded thereto dissolved and disappeared into water during the operation of fuel cell.

5) On the other hand, in the polymer film partially involving the hydrocarbon segments in the fluorinated carbon skeletons, the hydrocarbon segments, present in the main chains of skeletons, were cross-linked intermolecularly upon irradiation. As a result, even when the main chains were broken at the fluorinated carbon skeletons, the graft-polymerized styrene side chains were still bonded to the cross-linked macromolecules. Hence, in this case, the macromolecules with the graft-polymerized styrene side chains bonded did not dissolve and disappear into water in the operation of the fuel cell.

Based on the results of the above-described researches and developments, the inventors completed the following present solid-polymer-electrolyte membrane for a polymer-electrolyte fuel cell.

The present solid-polymer-electrolyte membrane for a polymer-electrolyte fuel cell is formed of a synthetic resin which comprises:

a main chain formed as a film, and formed of a copolymer made from a fluorocarbon-based vinyl monomer and a hydrocarbon-based vinyl monomer; and a hydrocarbon-based side chain involving a sulfonic group.

In accordance with the present invention, a process is provided for producing the present solid-polymer-electrolyte membrane for a polymer-electrolyte fuel cell. The process comprises the steps of:

irradiating a film-shaped copolymer made from a fluorocarbon-based vinyl monomer and a hydrocarbon-based vinyl monomer, and thereafter contacting a polymerizable alkenyl benzene with the irradiated copolymer, thereby forming a graft side chain resulting from the polymerizable alkenyl benzene; and introducing a sulfonic group into the resulting graft side chain.

Moreover, a modified version of the present process is provided for producing the present solid-polymer-electrolyte membrane for a polymer-electrolyte fuel cell. The modified version comprises:

irradiating a film-shaped copolymer made from a fluorocarbon-based vinyl monomer and a hydrocarbon-based vinyl monomer, and thereafter contacting a polymerizable alkenyl benzene having a sulfonic group with the irradiated copolymer, thereby forming a graft side chain resulting from the polymerizable alkenyl benzene having a sulfonic group.

The present solid-polymer-electrolyte membrane comprises a main chain, and a hydrocarbon-based side chain. The main chain is formed of a copolymer made from a fluorocarbon-based vinyl monomer and a hydrocarbon-based vinyl monomer. The hydrocarbon-based side chain involves a sulfonic group.

The main chain constitutes a major portion of the present solid-polymer-electrolyte membrane. Into the main chain, a graft-polymerized side chain is formed. The main chain includes a fluorocarbon segment, and a hydrocarbon segment. When the fluorocarbon segment is irradiated, it is believed to produce radicals which mainly constitute the starting points of graft polymerization. When the hydrocarbon segment is irradiated, it also produces radicals which constitute the staring points of graft polymerization, but part of the produced radicals are recombined with each other to form cross-linked constructions. As a result, even if the fluorocarbon segment is broken by the irradiation, the main chain per se is cross-linked and bonded continuously by the cross-linked hydrocarbon segment. Hence, it is believed that the strength of the membrane can be maintained satisfactorily high, and simultaneously a high grafting rate can be attained.

The copolymer made from a fluorocarbon-based vinyl monomer and a hydrocarbon-based vinyl monomer (hereinafter simply referred to as the "present main-chain resin) can be one expressed by the following chemical formula (1):

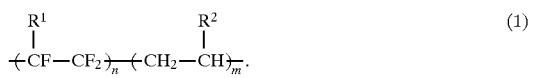

In the present main-chain resin, $R^1$ can be a fluorine atom or a fluoroalkyl group whose number of carbon atoms is from 1 to 3, $R^2$ can be a hydrogen atom or an alkyl group whose number of carbon atoms is from 1 to 3 can be an integer of 1 or more, and n can be an integer of 1 or more. It is further preferred that the number of carbon atoms in $R^1$ and $R^2$ can be 3 or less. It is furthermore preferred that $R^1$ can be a fluorine atom, and $R^2$ can be a hydrogen atom. Note that, in the present main-chain resin, the number of structural units, m and n, can be large enough to form a solid polymer.

The present main-chain resin is available in a variety of forms. In the present invention, it is formed as a membrane. Note that the thickness of the membrane is not limited in particular, and that the thickness can be adjusted so as to satisfy the objective, for example, of establishing a sufficient strength and a low electric resistance.

The side chain, which is introduced into or branched from the present main-chain resin, is a hydrocarbon-based side chain containing a sulfonic group (hereinafter simply referred to as the "present side-chain resin"). The present side-chain resin can be one expressed by the following chemical formula (2):

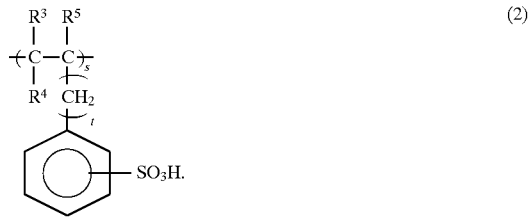

The present side-chain resin is a component for introducing an ion-exchanging function into the present solid-polymer-electrolyte membrane. In the present side-chain resin, $R^3$, $R^4$, and $R^5$ can be a hydrogen atom or an alkyl group whose number of carbon atoms is from 1 to 3, respectively. When the number of carbon atoms in $R^3$, $R^4$, and $R^5$ of the present side-chain resin is too many, the resulting side chain cannot be formed satisfactorily, or the polymerization cannot be fully developed. Therefore, it is preferred that the number of carbon atoms in $R^3$, $R^4$, and $R^5$ can be 3 or less. It is further preferred that $R^3$ and $R^4$ can be a hydrogen atom, respectively, and $R^5$ can be a hydrogen atom or an alkyl group.

In the present side-chain resin, t can be 0 or an integer of 1 or more, especially t can preferably be 0. It is most preferred that $R^3$, $R^4$, and $R^5$ can be a hydrogen atom, respectively, and t can be 0: namely; this is the case where styrene having a sulfonic group results in the present graft-polymerized side-chain resin.

Note that, however, s is determined as desired so that the resulting present solid-polymer-electrolyte membrane can satisfactorily attain a grafting rate, an ion-exchange capacity, and a water content, and accordingly has a value of at least one.

The hydrocarbon-based side chain containing a sulfonic group can be prepared by graft-polymerizing a polymerizable alkenyl benzene, or a polymerizable alkenyl benzene containing a sulfonic group, onto the copolymer, or the present main-chain resin which is prepared from a fluoro-carbon vinyl monomer and a hydrocarbon-vinyl monomer. The polymerizable alkenyl benzene can be one expressed by the following chemical formula (3):

The polymerizable alkenyl benzene having a sulfonic group can be one expressed by the following chemical formula (4):

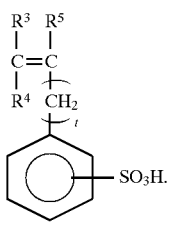

(4)

In the chemical formulas (3) and (4), $R^3$, $R^4$, and $R^5$ can be a hydrogen atom or an alkyl group whose number of carbon atoms is from 1 to 3, respectively, and t can be 0 or an integer of 1 or more.

A grafting rate of the resulting present solid-polymer-electrolyte membrane can be calculated by the following equation:

(Grafting Rate (%)) =

[{(Weight of Membrane after Grafting) −

(Weight of Membrane before Grafting)}/

(Weight of Membrane before Grafting)] × 100.

In order to give proper ion-exchange capacity and water content to the present solid-polymer electrolyte membrane, a grafting rate can preferably be controlled to 10% or more, further preferably 20% or more. Moreover, in order to give adequate tensile strength, elongation, gas repellency, bondability to electrodes, and oxidation resistance to the present solid-polymer electrolyte membrane, a grafting rate can preferably be controlled to 150% or less, further preferably 130% or less, furthermore preferably 100% or less.

An ion-exchange capacity of the resulting present solid-polymer-electrolyte membrane can be calculated by the following equation:

(Ion-exchange Capacity (milli-equivalent/g)=(Quantity of $H^+$ Released by Membrane (milli-equivalent))/(Weight of Membrane (g)).

In order to give proper water content and low electric resistance to the present solid-polymer electrolyte membrane, an ion-exchange capacity can preferably be controlled to 1/0 milli-equivalent/g or more, further preferably 1.2 milli-equivalent/g or more. Moreover, in order to give adequate tensile strength, elongation, bondability to electrodes, and oxidation resistance to the present solid-polymer-electrolyte membrane, an ion-exchange capacity can preferably be controlled to 3.5 milli-equivalent/g or less, further preferably 3.0 milli-equivalent/g or less.

A water content of the resulting present solid-polymer-electrolyte membrane can be calculated by the following equation:

(Water Content (%))=[{(Weight (g) of Membrane Soaked with Water)−(Weight (g) of Dried Membrane)}/(Weight (g) of Dried Membrane)]×100.

In order to let a fuel cell employing the present solid-polymer-electrolyte membrane generate a sufficient power, a water content can preferably be controlled to 30% or more, further preferably 50% or more. Moreover, in order to inhibit the present solid-electrolyte-membrane from remarkably enlarging dimensionally, and to keep its strength properly, a water content can preferably be controlled to 200% or less, further preferably 150% or less.

The present solid-polymer-electrolyte membrane can be produced by either one of the following two processes. According to one process, a copolymer made from the fluorocarbon vinyl monomer and the hydrocarbon vinyl monomer is irradiated, and the irradiated copolymer is contacted with the polymerizable alkenyl benzene. Thus, the graft-polymer side chain resulting from the polymerizable alkenyl benzene. Thus, the graft-polymer side chain resulting from the polymerizable alkenyl benzene is formed. Thereafter, a sulfonic group is introduced into the graft-polymer side chain. According to another process, instead of a polymerizable alkenyl benzene, the above-described polymerizable alkenyl benzene having a sulfonic group is contacted with a copolymer made from the fluorocarbon-based vinyl monomer and the hydrocarbon-based vinyl monomer. This latter process obviates the subsequent sulfonating step, because the graft-polymer has a sulfonic group already.

When a copolymer made from the fluorocarbon-based vinyl monomer and the hydrocarbon-based vinyl monomer is irradiated, the copolymer produces radicals therein. The radicals react with the polymerizable alkenyl benzene, or the polymerizable alkenyl benzene having a sulfonic group. As a result, the graft-polymer side chain is formed.

When a dose of the irradiation is too less, the graft-polymer side chain does not grow satisfactorily. Therefore, a ray can be irradiated to a copolymer at a dose of 1 kGy or more, preferably 5 kGy or more, further preferably 10 kGy or more. When a dose of the irradiation is too much, a copolymer, made from the fluorocarbon-based vinyl monomer and the hydrocarbon-based vinyl monomer, is broken. Consequently, the resulting membranes are so brittle that they are not applicable to fuel cells. Hence, a copolymer can be irradiated at a dose of 100 kGy or less, preferably 80 kGy or less, further preferably 50 kGy or less.

In the present invention, any ray can be employed for the irradiation freely. For instance, a gamma ray or an accelerated electron beam can be employed therefor.

A copolymer made from the fluorocarbon-based vinyl monomer and the hydrocarbon-based vinyl monomer can be contacted with the polymerizable alkenyl benzene, or the polymerizable alkenyl benzene having a sulfonic group in vacuum, in inert-gas atmosphere, or in air. Note that, however, the contacting operation can preferably be carried out in vacuum, or in inert-gas atmosphere, in order to inhibit radicals from being extinguished by oxygen and to let the graft-polymer side chain grow sufficiently. In the contacting operation, the reaction temperature can preferably be controlled to a boiling point or less of the polymerizable alkenyl benzene in order that the resulting present membrane can hold a sufficient strength.

A sulfonic group can be introduced into the graft-polymerized membrane, resulting from a copolymer made from the fluorocarbon-based vinyl monomer and the hydrocarbon-based vinyl monomer, and the polymerizable alkenyl benzene, by using a variety of sulfonating agents in vacuum, in inert-gas atmosphere, or in air. Above all, in order to efficiently and fully introduce a sulfonic group thereinto, and to give a satisfactory strength to the present solid-polymer-electrolyte membrane, a sulfonic group can preferably be introduced thereinto by using chlorosulfonic acid or fluorosulfonic acid in vacuo or in inert-gas atmosphere. Among the sulfonating agents, chlorosulfonic acid is most preferred. In the sulfonic-group introducing operation, the reaction temperature can preferably be controlled to 50° C. or less in order that the resulting present membrane can hold a sufficient strength.

As having been described so far, contrary to conventional solid-polymer-electrolyte membranes, the thus prepared present solid-polymer-electrolyte membrane exhibits a high tensile strength and flexibility. Further, when it is combined with gas diffusion electrodes to construct fuel cells, an overall electric resistance of the resulting fuel cells is low.

Furthermore, its manufacturing cost is much less expensive than that of commercially available Nafion. Thus, it can be effectively applied to construct polymer-electrolyte fuel cells.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
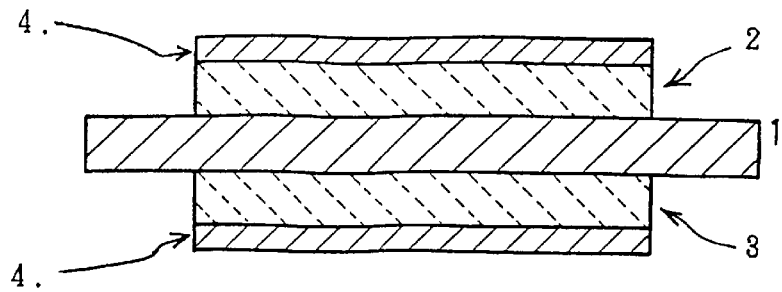
FIG. 1 illustrates a construction of a fuel cell in cross-section, fuel cell which was constructed by employing a preferred embodiment of the present solid-polymer-electrolyte membrane.

Having generally described the present invention, a further understanding can be obtained by reference to the specific preferred embodiments which are provided herein for the purpose of illustration only and not intended to limit the scope of the appended claims.

First Preferred Embodiment

An ethylene-tetrafluoroethylene (ETFE) copolymer film was washed with acetone, and was irradiated by a gamma ray at a dose of 2 kGy. Note that the ETFE copolymer film had a thickness of 50 µm, and that the irradiation source was Co-60.

The irradiated ETFE copolymer film was charged in a glass reactor tube, and thereafter styrene was put therein in an amount of 25 ml. After fully substituting nitrogen for the air in the reactor tube, the reactor tube was immersed into a constant-temperature bath whose temperature had been adjusted to 60° C. for 19 hours, thereby carrying out the graft polymerization.

After the radiation-graft polymerization reaction, the ETFE copolymer film was washed with benzene three times, and was put in a drier to dry.

The grafted film was then immersed into a mixture solution at room temperature for 30 minutes. The mixture solution included 30 parts by weight of chlorosulfonic acid, and 70 parts by weight of 1,1,2,2-tetrachloroethane. Thereafter, the film was taken out of the mixture solution, was washed with 1,1,2,2-tetrachloroethane, and was further washed with ion-exchanged water. Moreover, the film was immersed into a 2N KOH aqueous solution at 100° C. for 30 minutes, and thereafter was further immersed into a 1N $H_2SO_4$ aqueous solution at 100° C. for 30 minutes. Finally, the film was fully washed with ion-exchanged water. A First Preferred Embodiment of the present solid-polymer-electrolyte membrane was thus prepared.

The grafting rate, strength, specific resistance and ion-exchange capacity properties of the resulting membrane were determined. The results of the examination are set forth in Table 1 below.

Note that the grafting rate was determined by weighing the ETFE copolymer film before and after the graft polymerization in the above-described manner. The strength of the membrane was evaluated based on the criteria described below.

(Criteria on Strength of Membrane)

A: Membranes endured against a pressure of 80 $kgf/cm^2$ required for pressing and bonding gas diffusion electrodes at 165° C.;

B: Membranes broke sometimes under the pressing condition;

C: Membranes always broke under the pressing condition; and

D: Membranes were deteriorated considerably after the graft polymerization, and broke in the subsequent operations.

(Measurement of Specific Resistance)

The resulting membranes were immersed into a 1N NaCl aqueous solution, and were examined for the specific resistance by using a multi-meter (LCR meter 4261 made by YOKOGAWA HEWLETT PACKARD, Co., Ltd.).

(Measurement of Ion-exchange Capacity)

The resulting membranes were immersed into a 1N HCl aqueous solution at 50° C. for 10 minutes, and were washed with ion-exchanged water. Thereafter, the membranes were immersed into a 2N NaCl aqueous solution at 50° C. for 5 minutes, thereby expelling hydrogen ions out of the membranes into the NaCl aqueous solution. Eventually, the thus expelled hydrogen ions were titrated by neutralization with an NaOH aqueous solution to determine the ion-exchange capacity of membranes.

TABLE 1

| Identification | Polymer Film | Gamma-Ray Dose (kGY) | Grafting Rate (%) | Strength | Specific Resistance ($\Omega \cdot cm$) | Ion-exchange Capacity (milliequivalent/g) |
|---|---|---|---|---|---|---|
| 1st Pref. Embodiment | ETFE | 2 | 24 | A | 212 | 1.3 |
| 2nd Pref. Embodiment | ETFE | 4 | 34 | A | 129 | 1.6 |
| 3rd Pref. Embodiment | ETFE | 6 | 40 | A | 69 | 1.7 |
| 4th Pref. Embodiment | ETFE | 8 | 50 | A | 40 | 1.9 |
| 5th Pref. Embodiment | ETFE | 10 | 54 | A | 32 | 2.0 |

TABLE 1-continued

| Identification | Polymer Film | Gamma-Ray Dose (kGY) | Grafting Rate (%) | Strength | Specific Resistance (Ω · cm) | Ion-exchange Capacity (milliequivalent/g) |
|---|---|---|---|---|---|---|
| 6th Pref. Embodiment | ETFE | 20 | 61 | A | 6.8 | 2.7 |
| 7th Pref. Embodiment | ETFE | 20 | 47 | A | 18 | 2.3 |
| 8th Pref. Embodiment | ETFE | 25 | 88 | A | 15 | 2.7 |
| 9th Pref. Embodiment | ETFE | 100 | 115 | B | 14 | 2.7 |
| Comp. Ex. No. 1 | PTFE | 25 | 15 | C | 82 | 1.0 |
| Comp. Ex. No. 2 | PTFE | 100 | * | D | * | * |
| Comp. Ex. No. 3 | FEP | 25 | 51 | B | 52 | 2.0 |
| Comp. Ex. No. 4 | FEP | 100 | 53 | D | * | * |
| Comp. Ex. No. 5 | PFA | 25 | 53 | C | 78 | 2.0 |
| Comp. Ex. No. 6 | PFA | 100 | 49 | D | * | * |

(Note)
"ETFE" means an ethylene-tetrafluoroethylene copolymer film.
"PTFE" means a tetrafluoroethylene polymer film.
"FEP" means a tetrafluoroethylene-hexafluoropropylene copolymer film.
"PFA" means a tetrafluoroethylene-perfluoroalkylvinylether copolymer film.
The physical properties specified with * could not be evaluated because the films broke or lost during the examinations.

Second through Ninth Preferred Embodiment and Comparative Example Nos. 1 through 6

Except that a gamma-ray dose was varied as set forth in Table 1 above, Second through Ninth Preferred Embodiments of the present solid-polymer-electrolyte membrane were prepared in the same manner as the First Preferred Embodiment.

Except that a copolymer film and a gamma-ray dose were varied as recited in Table 1 above, Comparative Example Nos. 1 through 6 were prepared in the same manner as the First Preferred Embodiment.

The thus prepared solid-polymer-electrolyte membranes were examined for their physical properties in the same manner as the First Preferred Embodiment, and the results of the examination are summarized in Table 1 above.

It is evident from the results set forth in Table 1 that the First through Ninth Preferred Embodiments of the present solid-polymer-electrolyte membrane could attain a high grafting rate even by a small dose of irradiation. On the other hand, Comparative Example Nos. 1 through 6 could not show an enlarged grafting rate. In particular, Comparative Example Nos. 1 and 2 employing the PTFE polymer film exhibited an extremely small grafting rate. Even when the dose of radiation was increased, not only were Comparative Example Nos. 1 and 2 not applied to construct a fuel cell, but also they were so brittle that they could not be examined for their physical properties.

Comparing the Fourth Preferred Embodiment with Comparative Example Nos. 3 and 5, they had a substantially identical grafting rate. However, the Fourth Preferred Embodiment exhibited a lower specific resistance than those of Comparative Example Nos. 3 and 5. Thus, the Fourth Preferred Embodiment was apparently suitable for constructing a fuel cell.

Moreover, the results of the evaluation recited in Table 1 show that the First through Ninth Preferred Embodiments of the present solid-polymer-electrolyte membrane had such a strength that they could satisfactorily be applied to construct a fuel cell. Comparative Example Nos. 1 through 6 had inadequate strength so that they were inadequate for constructing a fuel cell.

The aforementioned advantages of the First through Ninth Preferred Embodiments are believed to be effected by the following reasons.

When the copolymer, made from the fluorocarbon-based vinyl monomer and the hydrocarbon-based vinyl monomer is irradiated, the fluorinated main chains of the copolymer are predominantly subjected to scission at the carbon-carbon bonds to produce radicals. The polymerizable alkenyl benzene is graft-polymerized into these radicalized segments. Upon the irradiation, the unfluorinated main chains of the copolymer are predominantly subjected to cleavage at the carbon-hydrogen bonds to produce radicals. In addition to the graft polymerization reaction with the polymerizable alkenyl benzene, these radicals were likely to re-combine, and form cross-linked constructions intermolecularly. Thus, in the radiation-graft polymerization of the present solid-polymer-electrolyte membrane, the radicals resulting from the fluorinated main chains, and the radicals resulting from the unfluorinated main chains and capable of cross-linking are produced simultaneously. As a result, the present solid-polymer-electrolyte membrane can presumably maintain its strength. Contrary to the present solid-polymer-electrolyte membrane, in the graft polymerization reaction of conventional solid-polymer-electrolyte membrane, there exist no radicals capable of intermolecularly forming the cross-linked constructions, because the main chains of conventional solid-polymer-electrolyte membrane are completely fluorinated. Hence, the main chains of conventional solid-polymer-electrolyte membrane are simply disconnected to low-molecular weight fractions in operating fuel cells, and sulfonic groups attached to the main chains are easily lost. Thus, conventional solid-polymer-electrolyte membrane cannot keep its strength and performance at all.

(Evaluation of Output Voltage Performance)

The thus prepared Sixth and Seventh Preferred Embodiments of the present solid-polymer-electrolyte membrane, Comparative Example No. 3, and a commercially available Nafion membrane were utilized to construct a fuel cell as illustrated in FIG. 1. The Nafion membrane had a thickness of 100 $\mu$m, and exhibited an ion-exchange capacity of 0.91 milli-equivalent/g.

As illustrated in FIG. 1, the fuel cell included a solid-polymer-electrolyte membrane 1, gas diffusion electrodes 2, 3 holding the membrane 1 therebetween, electricity collectors 4, 4 holding the gas diffusion electrodes 2, 3 and the membrane 1 therebetween. The gas diffusion electrodes 2, 3 were formed of carbon black and a tetrafluoroethylene resin. The electricity collectors 4, 4 were formed of carbon. In the interfaces between the gas diffusion electrodes 2, 3 and the membrane 1, there was coated platinum in an amount of 0.4 mg/cm$^2$.

The component parts (e.g., the membrane 1, the gas diffusion electrodes 2, 3, and electricity collectors 4,4) of a fuel cell were wrapped with a fluorocarbon-resin sheet, a filter paper, a stainless plate, and a filter paper in this order. The thus wrapped component parts were placed on a hot pressing machine whose temperature had been adjusted to 100° C. in advance. The component parts were subjected to a pressure of 20 kgf/cm² at 100° C. for 5 minutes. Then, the component parts were further subjected to a pressure of 20 kgf/cm² at 132.5° C. for 5 minutes. The component parts were furthermore subjected to a pressure of 20 kgf/cm² at 165° C. for 5 minutes. Thereafter, the pressure was increased to 80 kgf/cm², and was held thereat for 90 seconds. A plurality of fuel cells for the evaluation of output voltage performance were thus prepared.

Figure 2:
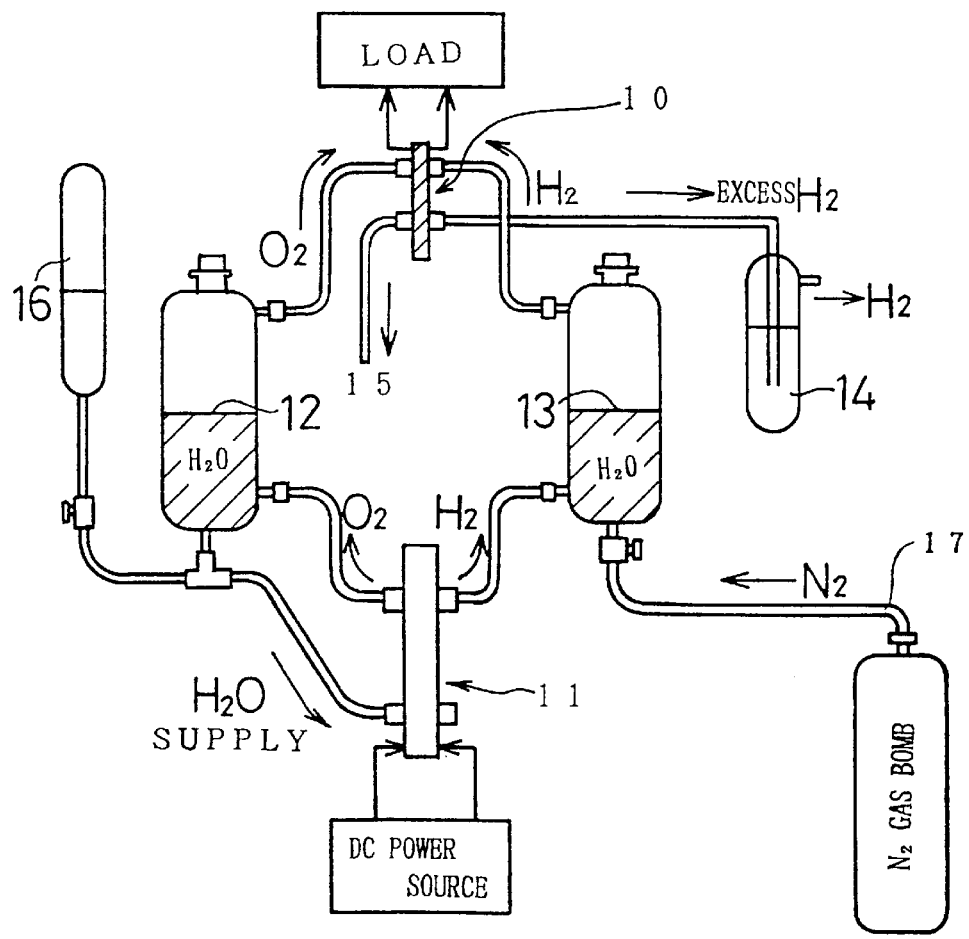
FIG. 2 is a schematic diagram for illustrating an apparatus for examining the performance of fuel cells.

The fuel cells were evaluated by using a testing apparatus as illustrated in FIG. 2, thereby determining their polarization curves.

The testing apparatus illustrated in FIG. 2 was operated as hereinafter described. A hydrogen gas and an oxygen gas were generated by means of water electrolysis by using a water-electrolysis gas generator 11. The generated oxygen gas, and the generated hydrogen gas were transferred through pots 12, 13, respectively. The oxygen and hydrogen gases absorbed water at the pots 12, 13. The oxygen and hydrogen gases with water absorbed were supplied to a fuel cell 10, respectively. The excessive hydrogen gas could be collected in the pot 14, and the excessive oxygen and the water produced could be discharged from an outlet port 15. The pots 12, 13 could be heated so that it was possible to control the water vapor content in the oxygen and hydrogen gases to be supplied to the fuel cell 10. A replenishing pot 16 could replenish the pot 13 with water. In order to inhibit the hydrogen gas form reacting with oxygen included in air, the pot 13 was connected with a nitrogen-gas bomb by way of a tube 17 so that nitrogen gas could be introduced into the pot 13 from the nitrogen-gas bomb.

Figure 3:
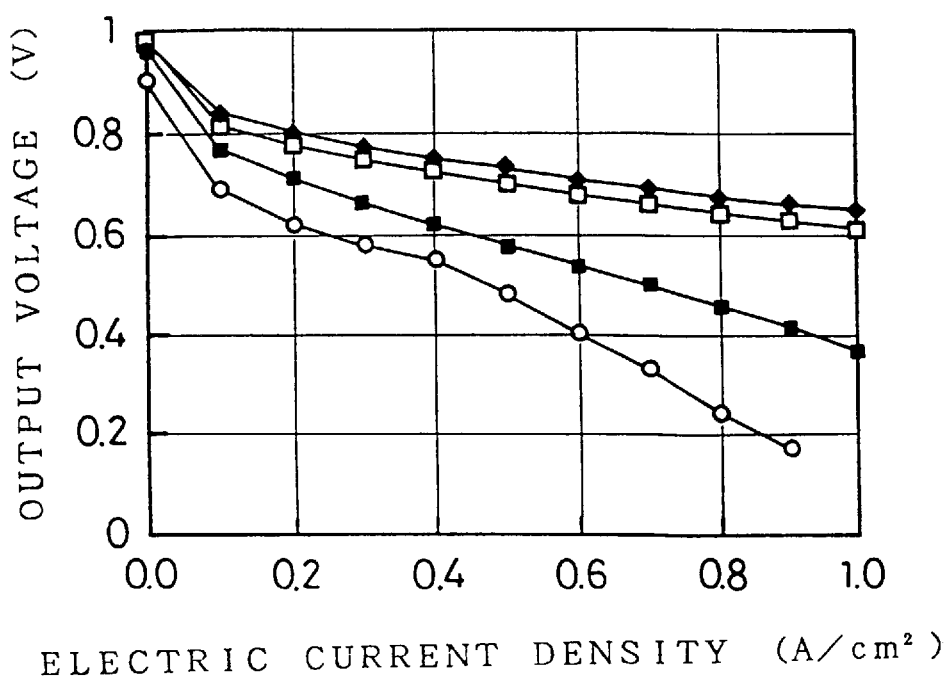
FIG. 3 is a graph for illustrating the cell performance of fuel cells by the relationships between output voltages and electric current densities, fuel cells which were constructed by employing preferred embodiments of the present solid-polymer-electrolyte membrane, and conventional solid-polymer-electrolyte membranes.

A predetermined load was applied to the fuel cell 10 in order to observe the output voltage variation, and the polarization curve of the fuel cell 10 was determined. FIG. 3 shows the relationships between the load (or electric current density) and the output voltage. In FIG. 3, the solid diamonds (♦) specify the polarization curve obtained in Test No. 1 in which the fuel cell was constructed by using the Sixth Preferred Embodiment of the present solid-polymer-electrolyte membrane; the blank squares (□) specify the polarization curve obtained in Test No. 2 in which the fuel cell was constructed by using the Seventh Preferred Embodiment of the present solid-polymer-electrolyte membrane; the blank circles (○) specify the polarization curve obtained in Comparative Test No. 1 in which the fuel cell was constructed by using Comparative Example No. 3 of conventional solid-polymer-electrolyte membrane; and the solid squares (■) specify the polarization curve obtained in Comparative Test No. 2 in which the fuel cell was constructed by using the commercially available Nafion membrane. Note that, in Test Nos. 1 and 2 as well as in Comparative Test Nos. 1 and 2, the used gas diffusion electrodes had a surface area of 10 cm²; platinum and ruthenium were loaded as catalysts in the interfaces in an amount of 0.77 mg/cm² and 0.23 mg/cm², respectively; the fuel cells were operated at a temperature of 70° C.; and the hydrogen gas, and the oxygen gas were supplied to the fuel cells at 1 atm, respectively.

It is apparent from the results illustrated in FIG. 3 that the fuel cells employing the preferred embodiments of the present solid-polymer-electrolyte membrane did not exhibit a sharply deteriorating output voltage even when the electric current density was increased, and that they exhibited a high output voltage at any electric current density.

On the other hand, when the electric current density was zero, the fuel cells exhibited a relatively high output voltage (i.e., an opening output voltage) in Comparative Test Nos. 1 and 2. However, when the electric current density was increased, the fuel cells exhibited a lower output voltage than those of the fuel cells prepared in Test Nos. 1 and 2.

(Durability Test)

Figure 4:
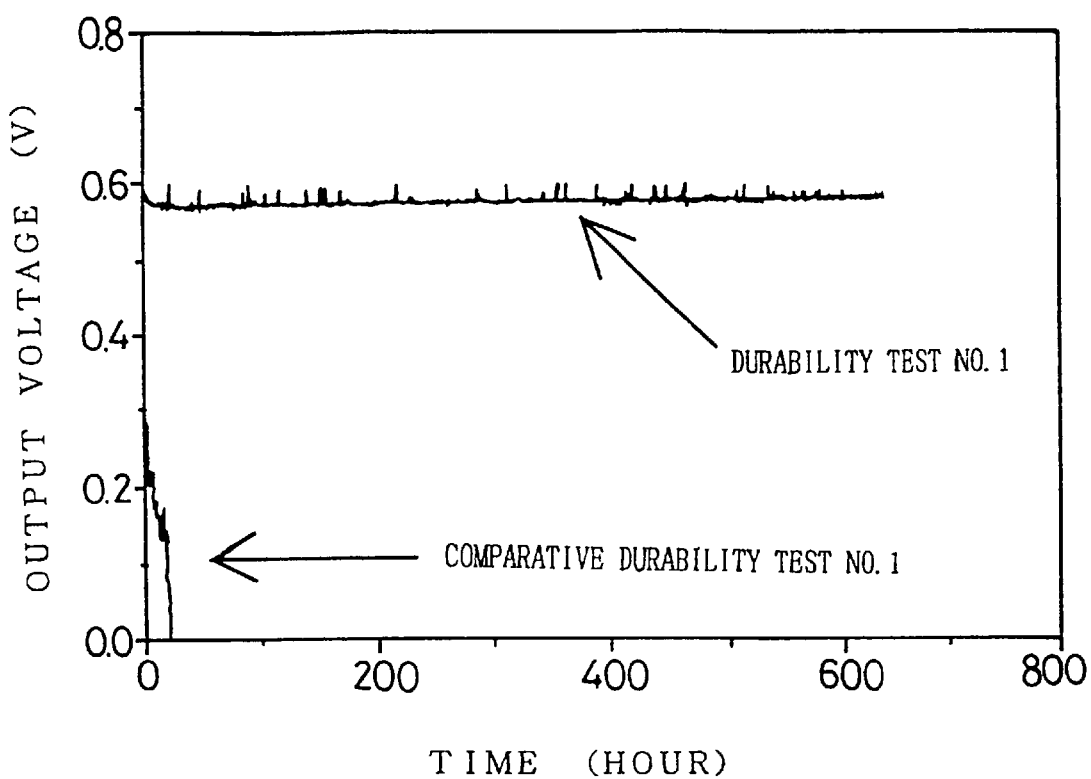
FIG. 4 is a graph for illustrating the durability of fuel cells by the relationships between output voltages and time elapsed, fuel cells which were constructed by employing a preferred embodiment of the present solid-polymer-electrolyte membrane, and a conventional solid-polymer-electrolyte membrane.

Except that the electric current density was fixed at 0.7 A/cm², the fuel cells prepared in Test no. 1 and Comparative Test No. 1 were operated in the same manner as Test No. 1 above, and were examined for the durability. FIG. 4 illustrates the results of this durability test.

It is appreciated from FIG. 4 that the fuel cell employing the Sixth Preferred Embodiment of the present solid-polymer-electrolyte membrane exhibited a stable output voltage for a long period time. After the durability test, the fuel cell was disassembled to examine the appearance of the membrane. As a result, no change was found in the appearance of the membrane, and the ion-exchange capacity did not show nay change.

On the other hand, the fuel cell employing Comparative Example No. 3 of conventional solid-polymer-electrolyte membrane apparently exhibited a deteriorating output voltage as the time elapsed. In fact, after operating the fuel cell for 20 hours, the fuel cell did not generate electricity at all.

Having now fully described the present invention, it will be apparent to one of ordinary skill in the art that many changes and modifications can be made thereto without departing from the spirit or scope of the present invention as set forth herein including the appended claims.

What is claimed is:

1. A solid-polymer-electrolyte membrane for a polymer-electrolyte fuel cell, comprising:

a synthetic resin of a cross-linked copolymer whose main chain is comprised of units of a fluorocarbon vinyl monomer and of a hydrocarbon vinyl monomer, said cross-linked copolymer having grafted side chain units consisting of formula (2):

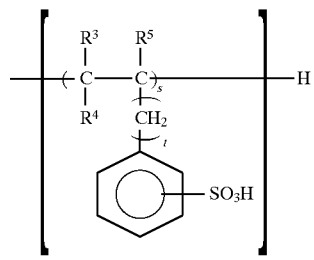

wherein $R^3$, $R^4$ and $R^5$ are each hydrogen or a $C_{1-3}$ alkyl group, s is an integer of 1 or more, and t is 0 or an integer of 1 or more, said grafted side chain units of formula (2) being present in an amount of from 10–15% by weight with respect to 100% by weight of said main chain.

2. The solid-polymer-electrolyte membrane according to claim 1, wherein said main chain has the formula (1):

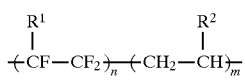

wherein $R^1$ is a fluorine atom or a fluoro $C_{1-3}$ alkyl group, $R^2$ is a hydrogen atom or a $C_{1-3}$ alkyl group, m is an integer of 1 or more, and n is an integer of 1 or more.

3. The solid-polymer-electrolyte membrane according to claim 1, wherein said main chain is comprised of units of an ethylene-tetrafluoroethylene copolymer.

4. The solid-polymer-electrolyte membrane according to claim 1, wherein said grafted units of formula (2) are represented by a sulfonated styrene polymer.

5. The solid-polymer-electrolyte membrane according to claim 1, wherein:

said main chain is comprised of units of an ethylene-tetrafluoroethylene copolymer; and said grafted side chain units of formula (2) are represented by a sulfonated styrene polymer.

6. The solid-polymer-electrolyte membrane according to claim 1, which exhibits an ion-exchange capacity of from 1.0 to 3,5 milliequivalent/g.

7. The solid-polymer-electrolyte membrane according to claim 1, which exhibits a water content of from 30 to 200%.

8. A solid-polymer-electrolyte membrane for a polymer-electrolyte fuel cell, comprising:

a synthetic resin of a cross-linked copolymer whose main chain is comprised of units of a fluorocarbon vinyl monomer and of a hydrocarbon vinyl monomer, said cross-linked copolymer having grafted side chains consisting essentially of formula (2):

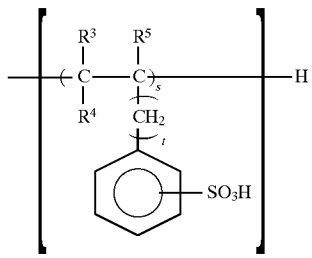

wherein $R^3$, $R^4$ and $R^5$ are each hydrogen atom or a $C_{1-3}$ alkyl group, s is an integer of 1 or more, and t is 0 or an integer of 1 or more.

9. The solid-polymer-electrolyte membrane according to claim 8, wherein said main chain has the formula (1):

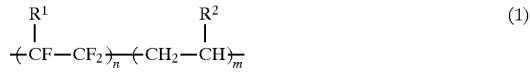

wherein $R^1$ is a fluorine atom or a fluoro $C_{1-3}$ alkyl group, $R^2$ is a hydrogen atom or a $C_{1-3}$ alkyl group, m is an integer of 1 or more, and n is an integer of 1 or more.

10. The solid-polymer-electrolyte membrane according to claim 8, wherein said main chain is comprised of units of an ethylene-tetrafluoroethylene copolymer.

11. The solid-polymer-electrolyte membrane according to claim 8, wherein said grafted units of formula (2) are represented by a sulfonated styrene polymer.

12. The solid-polymer-electrolyte membrane according to claim 8, wherein:

said main chain is comprised of units of an ethylene-tetrafluoroethylene copolymer; and said grafted side chain units of formula (2) are represented by a sulfonated styrene polymer.

13. The solid-polymer-electrolyte membrane for a polymer-electrolyte fuel cell according to claim 8, wherein said grafted side chain units of formula (2) are present in an amount of from 10–150% by weight with respect to 100% by weight of said main chain.

14. The solid-polymer-electrolyte membrane according to claim 8, which exhibits an ion-exchange capacity of from 1.0–3.5 milliequivalent/g.

15. The solid-polymer-electrolyte membrane according to claim 8, which exhibits a water content of from 30–200%.

* * * * *